US010107921B1

(12) United States Patent
Proksa

(10) Patent No.: US 10,107,921 B1
(45) Date of Patent: Oct. 23, 2018

(54) RADIATION DETECTOR AND X-RAY IMAGING SYSTEM

(71) Applicant: KONINKLIJKE PHILIPS N.V., Eindhoven (NL)

(72) Inventor: Roland Proksa, Neu Wulmstorf (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/769,368

(22) PCT Filed: Sep. 5, 2017

(86) PCT No.: PCT/EP2017/072138
§ 371 (c)(1),
(2) Date: Apr. 19, 2018

(87) PCT Pub. No.: WO2018/046454
PCT Pub. Date: Mar. 15, 2018

(30) Foreign Application Priority Data

Sep. 8, 2016 (EP) ..................................... 16187823

(51) Int. Cl.
*G01T 1/20* (2006.01)
*G01T 1/175* (2006.01)
*G01T 1/15* (2006.01)
(52) U.S. Cl.
CPC .............. *G01T 1/2006* (2013.01); *G01T 1/15* (2013.01); *G01T 1/175* (2013.01)
(58) Field of Classification Search
None
See application file for complete search history.

(56) References Cited

U.S. PATENT DOCUMENTS

| 4,109,168 | A | * | 8/1978 | Raymond | ................ | H03K 7/06 324/99 D |
| 6,366,231 | B1 | | 4/2002 | Rao | | |
| 8,988,267 | B1 | * | 3/2015 | Kimura | ................ | G01T 1/2928 341/155 |
| 9,160,939 | B2 | * | 10/2015 | Funaki | ................ | H03M 1/145 |
| 2005/0121617 | A1 | * | 6/2005 | Heismann | ............ | G01T 1/2928 250/370.11 |
| 2011/0291019 | A1 | | 12/2011 | Yuan | | |

(Continued)

FOREIGN PATENT DOCUMENTS

| EP | 2395566 | 12/2011 |
| EP | 2852154 | 3/2015 |

*Primary Examiner* — Yara B Green

(57) ABSTRACT

A radiation detector (100) with a scintillator (102), a photosensor (104) and an electronics module (108) is proposed. The electronics module (108) has a current-to-frequency converter (110) with a charge integrator (112) for generating a pulsed signal in having a frequency correlating with a charge generated by the photosensor (104) during a measurement cycle. The electronics module (108) further comprises a current source (120) for generating a frequency offset of the pulsed signal, an interrupting device (134) for interrupting an integration of the charge by the charge integrator (112), and a logic module (124) for determining the frequency of the pulsed signal. Therein, the logic module (124) is configured for determining an off-state of a radiation (404) source and for triggering the interrupting device (134) upon determining the off-state of the radiation source (404).

15 Claims, 3 Drawing Sheets

(56) References Cited

U.S. PATENT DOCUMENTS

| | | |
|---|---|---|
| 2011/0315888 A1* | 12/2011 | Herrmann .............. A61B 6/032 |
| | | 250/369 |
| 2012/0097856 A1 | 4/2012 | Chappo |
| 2013/0058456 A1* | 3/2013 | Kuwabara ............ A61B 6/4233 |
| | | 378/62 |
| 2013/0083886 A1 | 4/2013 | Carmi |
| 2014/0241506 A1 | 8/2014 | Iwashita |
| 2016/0073995 A1 | 3/2016 | Oda |
| 2016/0094798 A1 | 3/2016 | Chappo |

* cited by examiner

RADIATION DETECTOR AND X-RAY IMAGING SYSTEM

CROSS REFERENCE TO RELATED APPLICATIONS

This application is the U.S. National Phase application under 35 U.S.C. § 371 of International Application No. PCT/EP2017/072138, filed Sep. 5, 2017, published as WO 2018/046454 on Mar. 15, 2018, which claims the benefit of European Patent Application No 16187823.6 filed Sep. 8, 2016. These applications are hereby incorporated by reference herein.

FIELD OF THE INVENTION

The invention generally relates to the field of radiation detectors. More specifically, the invention relates to a radiation detector for an X-ray imaging system, an X-ray imaging system, a method for operating an X-ray imaging system, a computer program element and a computer-readable medium.

BACKGROUND OF THE INVENTION

Conventional radiation detectors, which may e.g. be utilized in computed tomography applications, usually comprise a scintillator coupled to a photo diode to convert an X-ray flux into optical light and thereafter into an electrical current, i.e. a charge per unit time. The current from the photo diode is usually converted and digitized by a current-to-frequency converter and a digital counter.

In order the keep the electronics at an appropriate operation point for low X-ray flux, usually a bias current parallel to the current from the photo diode is supplied to the current-to-frequency converter, which bias current generates an offset of the current supplied to the current-to-frequency converter.

Such radiation detectors usually suffer from a number of noise sources, such as for example the 1/f noise of the bias current. At a low X-ray flux this noise may become even more pronounced and may set limits for ultralow dose imaging.

US 2012/0097856 A1 discloses an imaging detector with a photosensor array optically coupled to a scintillator array, wherein a current-to-frequency converter as described above is utilized.

SUMMARY OF THE INVENTION

There may therefore be a need for a radiation detector and an X-ray imaging system with improved noise characteristics.

The object of the present invention is solved by the subject-matter of the independent claims. Further embodiments are incorporated in the dependent claims and the following description.

It should be noted that the following described first aspect of the invention equally applies to the X-ray imaging system, to the method for operating an X-ray imaging system, to the computer program element, and to the computer-readable medium.

A first aspect of the invention relates to a radiation detector, particularly to an X-ray detector. The radiation detector comprises a scintillator, a photosensor optically coupled to the scintillator, and an electronics module. The electronics module comprises a current-to-frequency converter, which comprises a charge integrator and a comparator. The current-to-frequency converter is configured for integrating and converting a charge generated and/or output by the photosensor during a measurement cycle into a pulsed signal having a frequency correlating with the charge. The pulsed may thus have a frequency which correlates with the charge per time, i.e. which correlates with a current generated by the photosensor. Therein, the electronics module comprises a current source for supplying a bias current to the current-to-frequency converter and for generating a frequency offset of the pulsed signal. The electronics module comprises an interrupting device for interrupting an integration of the charge by the charge integrator. The electronics module further comprises a logic module for determining the frequency of the pulsed signal, wherein the logic module is configured for determining an off-state of a radiation source and for triggering the interrupting device upon determining the off-state of the radiation source.

Rephrasing the first aspect of the invention, the radiation detector comprises a scintillator for converting a flux of radiation particles, such as X-ray photons, into visible light. This visible light is then converted to a charge by means of the photosensor, which may comprise a photodiode for converting the visible light output by the scintillator to the charge. The charge generated and/or output by the photosensor during the measurement cycle is then stepwise, i.e. in certain amounts and/or portions of charge, integrated by means of the charge integrator until a predefined charge threshold is reached and a single pulse of the pulsed signal is generated by means of the comparator when the predefined threshold is reached. Accordingly, the charge generated by the photosensor may be continuously integrated and converted to the digital pulsed signal during the measurement cycle having a frequency indicative of the charge generated during the measurement cycle. In order to keep the components of the electronics module at a feasible and/or appropriate operation point the bias current is supplied to the current-to-frequency converter, which results in a constant current, i.e. charge per unit time, supply to the charge integrator and in turn results in a constant frequency offset of the pulsed signal. This frequency-offset may be superimposed with a signal resulting from the charge generated by the photosensor during irradiation of the radiation detector, thereby generating the pulsed signal. The frequency of the pulsed signal output by the current-to-frequency converter is finally determined by means of the logic module. This conversion of current to frequency basically allows to determine an X-ray flux over several orders of magnitude dynamic range with high precision by determining the frequency of the pulsed signal.

By means of the interrupting device the charge integration of the charge integrator and/or a charge integration function of the charge integrator can be interrupted, suppressed, inhibited and/or stopped. The logic module of the radiation detector is configured for determining the off-state of the radiation source, in which no radiation and/or no radiation relevant for an actual imaging process impinges on the radiation detector. In response to and/or after determining the off-state of the radiation source, the logic module triggers the interrupting device such that the charge integration by means of the charge integrator is interrupted, suppressed, inhibited and/or stopped.

This approach may be particularly advantageous for X-ray flux modulation applications. In these applications an X-ray source may be operated in a pulsed mode, wherein the X-ray source is either alternately switched completely on and off or wherein the X-ray source is operated with a varying tube current and the radiation detector is irradiated with a relevant flux of X-ray photons only during certain time intervals used for an acquisition of projection data and thus used for image reconstruction.

Accordingly, by determining the off-state of the radiation source and interrupting the charge integration of the charge integrator, it may be ensured e.g. in flux modulation applications that during periods of time, in which the radiation detector is not irradiated and/or not irradiated with an X-ray flux relevant for image reconstruction, the bias current does not contribute to the pulsed signal, i.e. the bias current is not digitized by means of the current-to-frequency converter. Thus, noise of the bias current, such as 1/f noise, is suppressed during the off-state of the radiation source. In other words, by determining the off-state and interrupting the charge integration upon determining the off-state, it may be ensured that the bias current only contributes to the noise during the measurement cycle and/or during an integration period, during which the charge should be generated by the photosensor and/or during which the charge should be integrated by the charge integrator.

The term "off-state" of the radiation source may refer to a period and/or an interval of time, in which no radiation particles impinge onto the detector and/or in which no flux of radiation particles relevant for acquisition of projection data impinges onto the detector. Referring to X-ray flux modulation applications, the "off-state" may denote a state, in which the X-ray source is completely switched off and/or in which only a small tube current is supplied to the X-ray tube such that an X-ray flux may generated, which may not be used for image reconstruction and/or acquisition of projection data.

Accordingly, the term "measurement cycle" may refer to a period and/or interval of time, in which the pulsed signal generated by a flux of radiation particles, e.g. an X-ray flux, is to be detected by means of the radiation detector in order to acquire projection data for image reconstruction. The measurement cycle may be at least as long as an on-state of the radiation source, during which radiation particles impinge onto the detector and/or during which radiation flux relevant for acquisition of projection data impinges onto the detector. However, the measurement cycle may also be longer than the on-state. The measurement cycle may also refer to integration period, during which the charge from the photosensor and/or the bias current is integrated by means of the charge integrator.

Generally, the "interrupting device" may refer to an interrupting module, an interrupting unit, and/or to an interrupter for interrupting, inhibiting and/or suppressing charge integration of the charge integrator. By way of example this may be achieved via short-circuiting the charge integrator and/or via connecting the charge integrator to a ground potential. For instance, an integrating capacitor of the charge integrator may be short-circuited. Also, a supply of the bias current to the charge-to-frequency converter may be suppressed and/or interrupted by means of the interrupting device. Accordingly, the interrupting device may be configured for draining and/or purging the bias current such that integration of the bias current by the charge integrator is suppressed.

The "logic module" may among others be configured for processing digital signals, sample data, output digital signal, and/or output data. The logic module may e.g. refer to a discrete logic module, a discrete logic unit, a processing unit, and/or a processor.

According to an embodiment, the logic module is configured for triggering the interrupting device upon detecting a further pulse of the pulsed signal after determining the off-state of the radiation source. Accordingly, the logic module may be configured to trigger the interrupting device in response to and/or after detecting the further pulse. In other words, the logic module may be configured to trigger the interrupting device when two conditions are met, wherein the first condition is that the off-state of the radiation source is determined and wherein the second condition is that the further pulse of the pulsed signal is detected after determining the off-state. However, both conditions may also be fulfilled simultaneously. The further pulse may e.g. be generated by the bias current after the radiation source is switched to the off-state. By waiting for the further pulse and triggering the interrupting device after detection thereof, it may be ensured that the interrupting device is only triggered immediately after the charge of the charge integrator is converted to the further pulse such that the charge integrator may carry almost no charge and thus may be prepared for a subsequent measurement cycle. Accordingly, the charge integrator may be reset, such that nearly no charge is remaining in the charge integrator which would otherwise contribute to a pulsed signal of the subsequent measurement cycle. This may enhance and/or improve an overall precision acquisition of projection data.

According to an embodiment, the logic module is configured for determining the off-state of the radiation source by receiving a control signal indicative of the off-state and/or indicative of an on-state of the radiation source. By way of example, the control signal may e.g. be received directly from a controller of an X-ray imaging system, which controller may be configured for switching the radiation source on and/or off, i.e. to the on-state and/or the off-state. Also, the control signal may correlate with a switching signal of the controller for switching the radiation source to the off-state and/or the on-state. This may ensure that the off-state may be reliably determined by the logic module without time delay.

According to an embodiment, the interrupting device comprises an electronic switch, wherein the logic module is configured for triggering the interrupting device by actuating the electronic switch. The electronic switch may particularly be a semiconductor based switch, such as e.g. a transistor, a thyristor, a field-effect transistor, a metal-oxide-semiconductor field-effect transistor, a complementary metal-oxide-semiconductor or the like. The electronic switch may thus be actuated by providing an electrical signal to a gate terminal of the switch. Generally using an electronic switch may allow rather fast switching and thus rather fast triggering of the interrupting device with a compact and reliable circuitry.

According to an embodiment, the electronic switch is connected to a supply line interconnecting the current source and the current-to-frequency converter, wherein the electronic switch is configured for connecting the supply line to ground potential. This way, the bias current may be purged and/or drained when the interrupting device is triggered thereby reliably interrupting charge integration of the charge integrator.

According to an embodiment, the charge integrator of the current-to-frequency converter comprises an integrating capacitor, wherein the electronic switch of the interrupting device is configured to short-circuit the integrating capacitor of the charge integrator. The switch may be arranged in parallel to the integrating capacitor and provide a bypass path for the bias current upon actuation of the switch. This ensures that any charge is purged and/or drained from the integrating capacitor, thereby resetting the integrating capacitor and/or the charge integrator.

A second aspect of the invention relates to an X-ray imaging system, which comprises a radiation source for emitting X-rays, and a radiation detector as described above and in the following. Accordingly, the radiation detector may refer to an X-ray detector and the radiation source may refer to an X-ray source, such as an X-ray tube. Particularly, the X-ray imaging system may refer to a computed tomography (CT) imaging system.

According to an embodiment, the radiation source is a grid-controlled X-ray tube. The X-ray tube may comprise a grid arranged between an anode and a cathode of the X-ray tube. Therein, an electron flux from the anode to the cathode may be switched off with a negative control potential supplied to the grid in order to inhibit a generation of X-ray photons at the anode. Accordingly, the X-ray imaging system may for instance refer to a CT imaging system with fast X-ray flux modulation capabilities, such as X-ray tube grid switching. Therein, a switching time may be below 1 μsec, and the flux modulation may be used to do sparse angular sampling for CT. In addition, a pulse width modulation may be employed to irradiate the radiation detector only for a limited time interval within an integration period and/or the measurement cycle.

According to an embodiment, the X-ray imaging system further comprises a controller configured for alternately switching the radiation source to an on-state and an off-state by means of a switching signal, wherein the logic module of the radiation detector is configured for determining the off-state of the radiation source based on the switching signal of the controller. By way of example, in the on-state no potential and/or a positive potential may be applied to a grid of the X-ray tube, whereas in the off-state a negative potential may be applied to the grid to inhibit the generation of X-ray photons. The control signal based on which the logic module may determine the off-state of the radiation source may correlate with the switching signal, thereby allowing to reliably determine the off-state. Also, the switching signal may be directly provided as control signal to the logic module to determine the off-state.

A third aspect of the invention relates to a method for operating an X-ray imaging system with a radiation detector and a radiation source. The method comprises the steps of:
generating a charge during a measurement cycle of the X-ray imaging system, by irradiating the radiation detector, which comprises a photosensor optically coupled to a scintillator;
integrating and converting, by means of a current-to-frequency converter having a charge integrator, the charge into a pulsed signal having a frequency indicative of the charge generated during the measurement cycle;
supplying, by means of a current source, a bias current to the current-to-frequency converter;
determining, by means of a logic module of the radiation detector, an off-state of the radiation source; and
interrupting integration of the charge by the charge integrator after determining the off-state.

Therein, the charge generated during the measurement cycle may be stepwise integrated in certain portions and/or amounts of charge in order to generate the pulsed signal. In other words, the charge generated by the photosensor may be continuously integrated and digitized to the pulsed signal.

It should be noted that features and/or elements of the radiation detector as described above and in the following may be features and/or elements of the X-ray imaging system and/or the method. Vice versa, features of the X-ray imaging system and/or the method as described above and in the following may be features and/or elements of the radiation detector.

According to an embodiment, the method further comprises the step of detecting a further pulse of the pulsed signal after determining the off-state, wherein integration of the charge by means of the charge integrator is interrupted after the further pulse is detected.

According to an embodiment, the step of interrupting integration of the charge comprises resetting the charge integrator of the current-to-frequency converter.

According to an embodiment, the step of interrupting integration of the charge comprises short-circuiting an integrating capacitor of the charge integrator.

Alternatively or additionally the step of interrupting integration of the charge comprises connecting a supply line, via which the bias current is supplied to the current-to-frequency converter, to ground potential.

A fourth aspect of the invention relates to a computer program element, which when executed on a controller of an X-ray imaging system, instructs the controller to carry out the steps of the method as described above and in the following.

A fifth aspect of the invention relates to a computer-readable medium on which a computer program element, which when executed on a controller of an X-ray imaging system, instructs the controller to carry out the steps of the method as described above and in the following.

A computer-readable medium may be a floppy disk, a hard disk, an USB (Universal Serial Bus) storage device, a RAM (Random Access Memory), a ROM (Read Only memory) and an EPROM (Erasable Programmable Read Only Memory). A computer readable medium may also be a data communication network, e.g. the Internet, which allows downloading a program code.

These and other aspects of the invention will be apparent from and elucidated with reference to the embodiments described hereinafter.

BRIEF DESCRIPTION OF THE DRAWINGS

The subject matter of the invention will be explained in more detail in the following with reference to exemplary embodiments which are illustrated in the attached figures, wherein.

In principle, identical parts are provided with the same reference symbols in the figures.

DETAILED DESCRIPTION OF EMBODIMENTS

Figure 1:
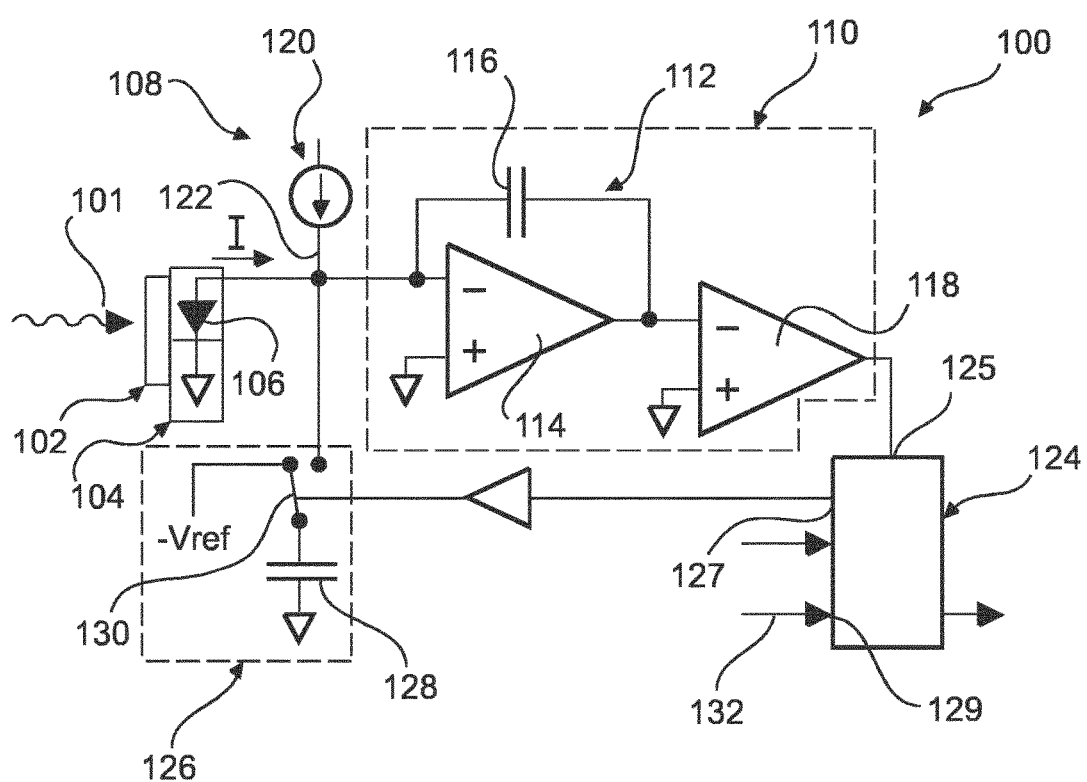
FIG. 1 shows schematically a radiation detector.

FIG. 1 shows schematically a conventional radiation detector 100. The radiation detector 100 may particularly be an X-ray radiation detector 100 for detecting X-ray photons.

The radiation detector 100 comprises a scintillator 102 and a photosensor 104, which comprises a photodiode 106 and which is optically coupled to the scintillator 102. X-ray photons 101 impinging onto the scintillator 102 are converted to visible and/or optical light, which is then converted to a charge and/or a current I by the photodiode 106.

The radiation detector 100 further comprises an electronics module 108 with a current-to-frequency converter 110. The current-to-frequency converter 110 comprises a charge integrator 112 having an amplifier 114 and an integrating capacitor 116. Amplifier 114 and capacitor 116 may be regarded as frontend amplifier of the converter 110. The current-to-frequency converter 110 further comprises a comparator 118 connected to an output of the amplifier 114 and configured for comparing a voltage at the output of amplifier 114 with a threshold value. The current-to-frequency converter 110 generally is configured for converting charge per unit time, i.e. a current, supplied to the converter 110 into a digital pulsed signal having a frequency indicative of and/or correlating with the charge per unit time and/or the current.

The electronics module 108 further comprises a current source 120 for supplying a bias current via a supply line 122 to the current-to-frequency converter 110.

Moreover, the electronics module 108 comprises a logic module 124 having a first input 125 for receiving the digital pulsed signal from the current-to-frequency converter 110.

The electronics module 108 further comprises a reset switch 126 for resetting the charge integrator 112 of the current-to frequency converter 110 during a measurement cycle and/or during an integration period. The reset switch 126 comprises a capacitor 128, which is charged by a reference voltage $V_{ref}$, and a switch element 130 which is connected to a control output 127 of the logic module 124.

A function of the electronics module 108 is as described in the following. The charge integrator 112, i.e. the amplifier 114 and the integrating capacitor 116, integrates a negative current I and/or charge generated by the photosensor 104 and/or the photodiode 106, wherein the integrating capacitor 116 carries a positive voltage, which is thus reduced by the current I and/or the corresponding charge. If the voltage of the integrator 112 and/or the integrating capacitor 116 reaches zero, a digital pulse is generated by the comparator 118. This pulse is transmitted via the first input 125 to the logic module 124, which in turn triggers the reset switch 126 and actuates the switch element 130 by an electrical signal. When the switch element 130 is actuated, the charge integrator 112 and/or the integrating capacitor 116 is charged with a positive reference charge package of the capacitor 128 which itself is charged by the reference voltage $V_{ref}$. If no bias current is supplied, the number of these events is counted by the logic module 124 and represents the total charge from the photosensor 104 and/or the photodiode 106, respectively, in an acquisition interval, a measurement cycle and/or an integration period.

Additionally, the time between a first and a last pulse or event may be measured, e.g. by providing a clock signal 132 to the logic module 124 via a clock input 129 of the logic module 124.

In order the keep the electronic components of the electronics module 108 at a feasible and/or appropriate operation point for a low flux of X-ray photons, the bias current is supplied by means of the current source 120. The bias current is supplied via supply line 122 parallel to the current I of the photosensor 104. The radiation detector 100 shown in FIG. 1 may suffer from a number of noise sources as for example a 1/f noise of the bias current. At a low X-ray flux this noise may become effective and may set limits for ultralow dose imaging.

Figure 2:
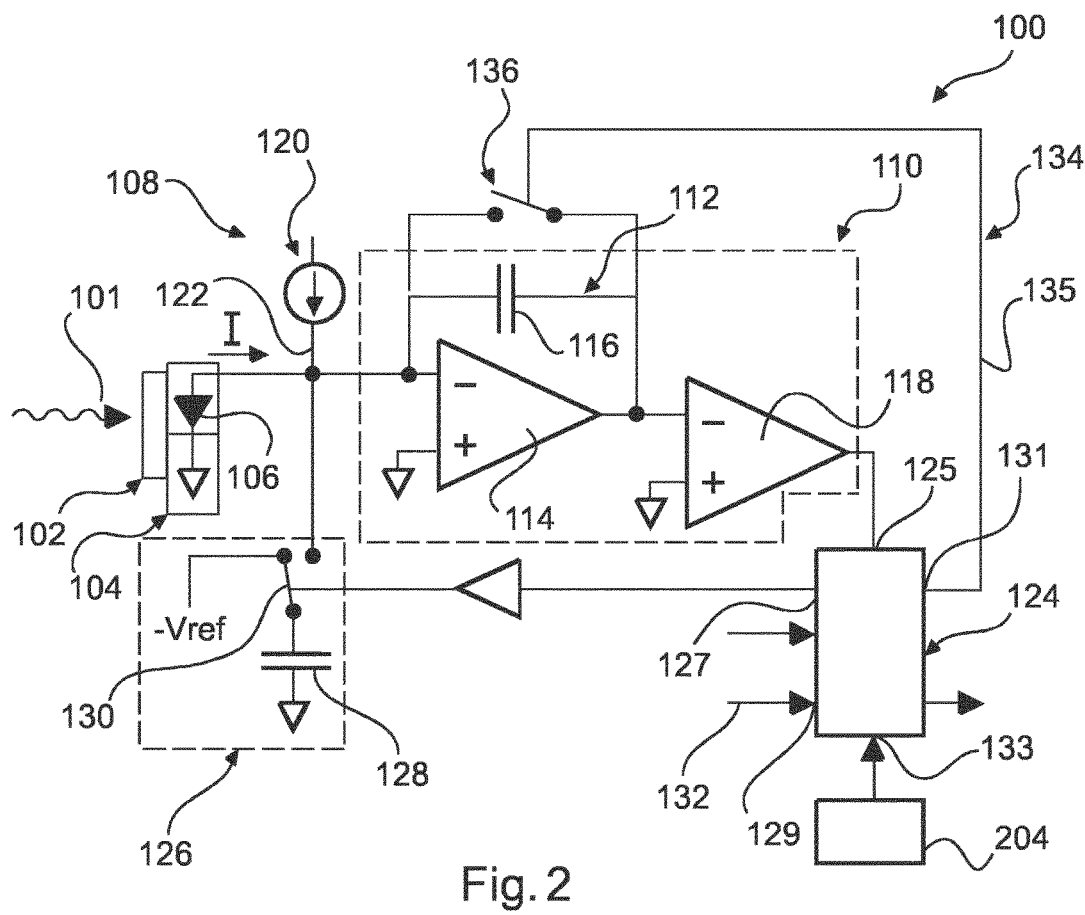
FIG. 2 shows schematically a radiation detector according to an embodiment of the invention.

FIG. 2 schematically shows a radiation detector 100 according to an embodiment of the invention. If not stated otherwise, the radiation detector 100 of FIG. 2 comprises the same functions, features and/or elements as the radiation detector 100 of FIG. 1.

The electronics module 108 of the radiation detector 100 comprises an interrupting device 134 for interrupting an integration of charge by the charge integrator 112 and/or for interrupting a charge integration function of the charge integrator 112. For this purpose, the interrupting device 134 comprises an electronic switch 136 arranged and/or connected in parallel to the integrating capacitor 116 of the charge integrator 112.

The electronic switch 136 may be e.g. any suitable semiconductor-based switch, which is actuateable via an actuation signal by the logic module 124. For this purpose, the logic module 124 comprises an output 131 for outputting the actuation signal and transmitting it via a line 135 to the electronic switch 136, e.g. to a gate terminal of the electronic switch 136. By actuation of the switch 136, i.e. by closing switch 136, a bypass path for the bias current is provided, the integrating capacitor 116 is short-circuited, and any charge is purged and/or drained from the integrating capacitor, thereby resetting the charge integrator 112 and/or the integrating capacitor 116.

Figure 4:
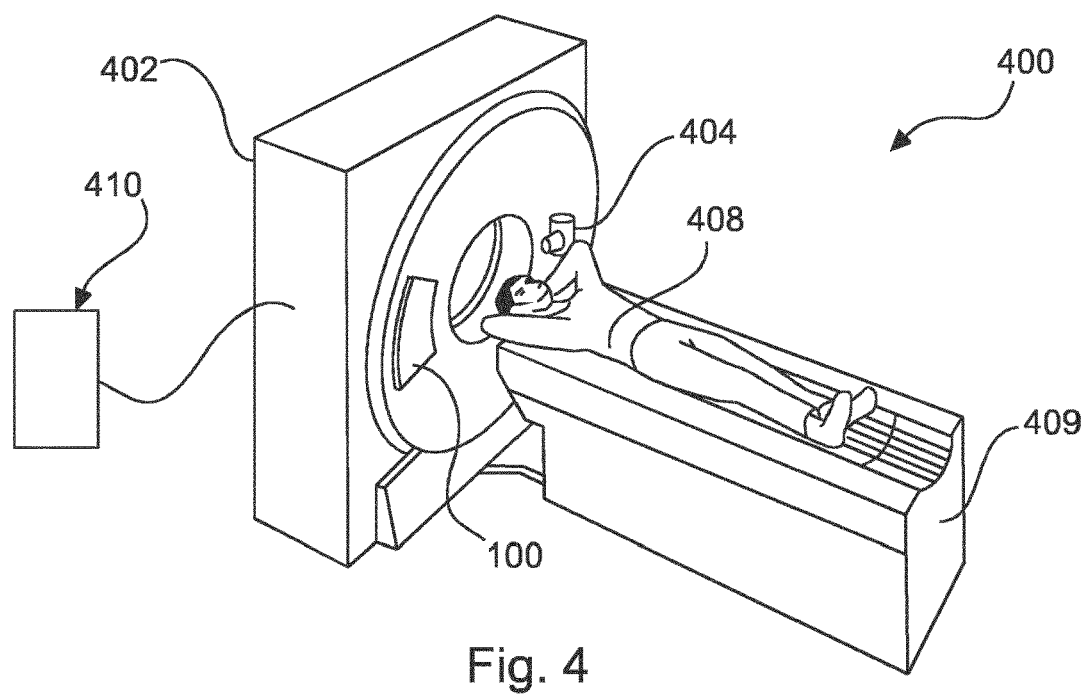
FIG. 4 shows schematically an X-ray imaging system according to an embodiment of the invention.

The logic module 124 further comprises a second input 133 and/or a flux input 133 for receiving a control signal, indicative of and/or correlating with an off-state of a radiation source (see FIG. 4). For instance, the control signal may be provided by a controller 204 (referring to controller 410 shown in FIG. 4) configured for switching the radiation source to an on-state and the off-state.

The logic module 124 is configured for triggering the interrupting device 134 by providing the actuation signal to the electronic switch 136 after, upon and/or in response to receiving the control signal and thus upon determining the off-state of the radiation source.

Further, the logic module 124 is configured for triggering the interrupting device upon detecting a further pulse of the pulsed signal after determining the off-state. This further pulse thus results from the bias current, which allows to comprehensively and reliably determine the frequency offset resulting from the bias current and/or which allows to subtract all pulses during the measurement cycle and/or the integration period, which are caused by the bias current contribution only. Accordingly, this allows to determine the number of pulses per measurement cycle and/or integration period which are only caused by the charge generated by the photosensor 104 during the measurement cycle and/or the integration period.

It is to be noted here, that additionally or alternatively the electronic switch 136 may be connected to the supply line 122 and the charge integration may be interrupted by means of the interrupting device 134 by connecting the supply line 122 to a ground potential.

A functionality and/or operation of the radiation detector 100 of FIG. 2 is briefly summarized in the following. The radiation detector 100 uses the control signal, which may be regarded as an X-ray-flux-on indicator signal, to limit the charge integration of the charge integrator 112 and the conversion of that charge to the pulsed signal to time intervals with flux of X-ray photons and/or to the measurement cycle and/or to the integration period. As a consequence, the electronic noise outside this interval does not contribute to the acquisition noise.

During the integration period and/or the measurement cycle, i.e. for example when the control signal indicates an on-state of the radiation source, the components of the electronics module 108 work like the conventional radiation detector 100 of FIG. 1. If the radiation source is switched to the off-state, i.e. if the flux period stops, the logic module 124, which may be regarded as digital control part of the radiation detector 100, waits until the next count event occurs, i.e. until the further pulse of the pulsed signal is detected. Because of the bias current, this will happen even without any current and/or charge from the photosensor 104. At this point, the charge integrator 112 is interrupted and/or stopped and any charge is purged and/or drained from the integrating capacitor 116. Thus, the integrator 112 is kept at zero volts. The electronic switch 136 will shortcut, short-circuit, purge and/or drain all currents, i.e. the bias current and all noise currents. When the next flux period, measurement cycle and/or integration period starts, the electronic switch 136 is actuated again, the shortcut is released and the charge integrator 112 is charged with the reference charge package, causing the integrator 112 to start charge integration again.

In addition to event and/or pulse counting, the time from the flux start and the last count and/or pulse within the measurement cycle can be measured by means of the logic module 124. This time can be used to exactly calculate the counts and/or pulses induced by the bias current which should be subtracted from the count events and/or pulses determined by the logic module 124 in order to increase an accuracy and precision of the measurement.

Figure 3:
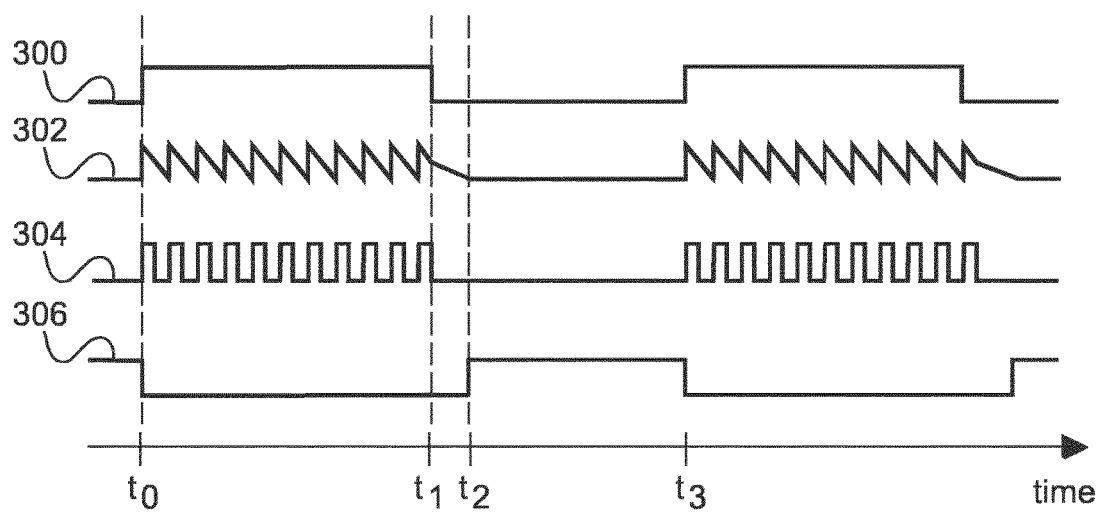
FIG. 3 shows schematically a timing diagram illustrating an operation of the radiation detector of FIG. 2.

FIG. 3 shows schematically a timing diagram illustrating an operation of the radiation detector 100 of FIG. 2. Therein, curve 300 shows the control signal, which indicates an on-state and an off-state of the radiation source, as a function of time. Curve 302 depicts the charge carried by the charge integrator 112 and/or the integrating capacitor 116 as a function of time. Curve 304 illustrates actuation of the reset switch 126 and/or the switching element 130 of the reset switch 126 as a function of time. Curve 306 illustrates actuation of the electronic switch 136 of the interrupting device 134 as a function of time.

An operation of the radiation detector 100 is as follows. At time $t_0$ a measurement cycle and/or integration period may start, wherein the radiation source is switched to the on-state as indicated by the control signal illustrated in curve 300. The charge integrator 112 is supplied with a positive charge package as illustrated by curve 302, which is caused by actuation of the reset switch 126 as indicated in curve 304. Further, the electronic switch 136 is opened, thereby allowing regular operation of the charge integrator 112.

The bias current and current I from the photosensor is supplied to the charge integrator 112, the charge of the integrating capacitor 116 is reduced resulting in a decreasing charge of the charge integrator 112 as illustrated in curve 302. When the charge of the integrating capacitor 116 reaches zero, the comparator 118 is triggered and a pulse is transmitted to the logic module 124, which in turns triggers the reset switch 126 and induces re-charging of the integrating capacitor 116 with the reference charge package. This results in the saw-teeth shaped signal of the integrator 112 depicted in curve 302.

At time $t_1$ the radiation source is switched to the off-state as indicated by the control signal shown in curve 300. Accordingly, the off-state is determined by the logic module 124. Since the radiation source is switched off, only the bias current is supplied to the charge integrator 112, and thus the slope of the last integrator pulse changes. The logic module 124 now waits until a further pulse is generated by the current-to-frequency converter at time $t_2$. When both conditions are met, i.e. the off-state is determined and the further pulse is detected, the logic module 124 triggers the interrupting device 134 by actuating the electronic switch 136 as illustrated by curve 306. As all charge from the integrator 112 is purged and/or drained the integrator 112 is kept at zero volts.

The time interval from $t_0$ to $t_1$ may refer to the on-state of the radiation source, and the time interval from $t_0$ to $t_2$ may refer to the measurement cycle and/or the integration period during which charge integration is performed by means of the integrator 112.

The interrupting device 134 then remains triggered and/or the switch 136 remains closed until the next measurement cycle starts at time $t_3$, which may be triggered by the control signal.

FIG. 4 shows schematically an X-ray imaging system 400 according to an embodiment of the invention. The X-ray imaging system 400 shown in FIG. 4 is a CT imaging system 400.

The X-ray imaging system 400 comprises a rotatable gantry 402 with an X-ray radiation source 404 that projects a beam of X-rays toward a radiation detector 406.

If not stated otherwise, the radiation detector 100 of FIG. 4 comprises the same features, functions and elements as the radiation detectors 100 described in previous FIGS. 1 to 3.

The radiation source 404 and the detector 100 are arranged on opposite sides of the gantry 402. By means of the detector 100 projected X-rays that pass through a patient 408 are sensed and/or detected, wherein patient 408 is arranged on a movable table 409.

The X-ray imaging system 400 further comprises a controller 410, which may among others govern rotation of gantry 402 and the operation of the X-ray source 404. The controller 410 may for instance refer to a control unit, a control arrangement and/or a computer.

Particularly, the radiation source 404 is grid-controlled X-ray tube 404 comprising an anode, a cathode and a grid arranged inbetween. Therein, an electron flux from the anode to the cathode may be switched off with a negative control potential supplied to the grid in order to inhibit a generation of X-ray photons at the anode. Accordingly, the X-ray imaging system 400 may for instance refer to a CT imaging system with fast X-ray flux modulation capabilities, such as X-ray tube grid switching. Therein, a switching time may be below 1 μsec, and the flux modulation may be used to do sparse angular sampling for CT. In addition, a pulse width modulation may be employed to irradiate the radiation detector only for a limited time interval within an integration period and/or the measurement cycle.

Moreover, the controller 410 is configured for alternately switching the radiation source 404 to an on-state and an off-state by means of a switching signal, wherein the logic module 124 of the radiation detector 100 is configured for determining the off-state of the radiation source 404 based on the switching signal of the controller 410. By way of example, in the on-state no potential may be applied to the grid of the X-ray tube 404, whereas in the off-state a negative potential may be applied to the grid to inhibit the generation of X-ray photons.

Figure 5:
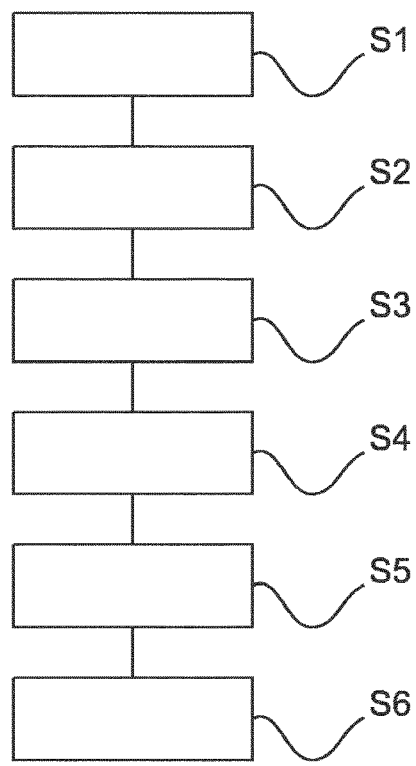
FIG. 5 shows schematically a flow chart illustrating steps of a method for operating an X-ray imaging system according to an embodiment of the invention.

FIG. 5 schematically shows a flow chart illustrating steps of a method for operating an X-ray imaging system 400 with a radiation detector 100 and a radiation source 404 according to an embodiment of the invention.

In a step S1 a charge is generated during a measurement cycle of the X-ray imaging system 400, by irradiating the radiation detector 100 with the radiation source 404, which radiation detector 100 comprises a photosensor 104 optically coupled to a scintillator 102.

In a step S2 the charge is integrated and converted into a pulsed signal having a frequency indicative of the charge generated during the measurement cycle, wherein step S2 is performed by means of a current-to-frequency converter 110 having a charge integrator 112.

In a further step S3 a bias current is supplied to the current-to-frequency converter 110 by means of a current source 120.

In a step S4 an off-state of the radiation source 404 is determined by means of a logic module 124 of the radiation detector 100.

In a step S5 a further pulse of the pulsed signal is determined by means of the logic module 124 after determining the off-state in step S4.

Finally, in a step S6 integration of the charge by the charge integrator 112 is interrupted by means of an interrupting device 134 which is triggered by the logic module 124 upon determining the off-state of the radiation source 404 in step S4 and upon detecting the further pulse in step S5.

Optionally, interrupting integration of the charge comprises resetting the charge integrator 112 of the current-to-frequency converter 110.

Optionally, interrupting integration of the charge comprises short-circuiting an integrating capacitor 116 of the charge integrator 112 and/or connecting a supply line 122, via which the bias current is supplied to the current-to-frequency converter 110, to ground potential.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A radiation detector, comprising:
a scintillator;
a photosensor optically coupled to the scintillator; and
an electronics module with a current-to-frequency converter, which comprises a charge integrator and a comparator, for integrating and converting a charge generated by the photosensor during a measurement cycle into a pulsed signal having a frequency correlating with the charge;
wherein the electronics module comprises a current source for supplying a bias current to the current-to-frequency converter and for generating a frequency offset of the pulsed signal;
wherein the electronics module comprises an interrupting device for interrupting an integration of the charge by the charge integrator;
wherein the electronics module comprises a logic module for determining the frequency of the pulsed signal; and
wherein the logic module is configured for determining an off-state of a radiation source and for triggering the interrupting device upon determining the off-state of the radiation source.

2. The radiation detector according to claim 1,
wherein the logic module is configured for triggering the interrupting device upon detecting a further pulse of the pulsed signal after determining the off-state.

3. The radiation detector according to claim 1,
wherein the logic module is configured for determining the off-state of the radiation source by receiving a control signal indicative of the off-state and/or indicative of an on-state of the radiation source.

4. The radiation detector according to claim 1,
wherein the interrupting device comprises an electronic switch; and
wherein the logic module is configured for triggering the interrupting device by actuating the electronic switch.

5. The radiation detector according to claim 4,
wherein the electronic switch is connected to a supply line interconnecting the current source and the current-to-frequency converter; and
wherein the electronic switch is configured for connecting the supply line to ground potential.

6. The radiation detector according to claim 4,
wherein the charge integrator of the current-to-frequency converter comprises an integrating capacitor; and
wherein the electronic switch of the interrupting device is configured to short-circuit the integrating capacitor of the charge integrator.

7. An X-ray imaging system, comprising:
a radiation source for emitting X-rays; and
a radiation detector according to claim 1.

8. The X-ray imaging system according to claim 7,
wherein the radiation source is a grid-controlled X-ray tube.

9. The X-ray imaging system according to claim 7, further comprising:
a controller configured for alternately switching the radiation source to an on-state and an off-state by means of a switching signal,
wherein the logic module of the radiation detector is configured for determining the off-state of the radiation source based on the switching signal of the controller.

10. A method for operating an X-ray imaging system with a radiation detector and a radiation source, the method comprising the steps of:
generating a charge during a measurement cycle of the X-ray imaging system, by irradiating the radiation detector, which comprises a photosensor optically coupled to a scintillator;
integrating and converting, by means of a current-to-frequency converter having a charge integrator, the charge into a pulsed signal having a frequency indicative of the charge generated during the measurement cycle;
supplying, by means of a current source a bias current to the current-to-frequency converter;
determining, by means of a logic module of the radiation detector, an off-state of the radiation source; and
interrupting an integration of the charge by the charge integrator after determining the off-state.

11. The method according to claim 10, further comprising:
detecting a further pulse of the pulsed signal after determining the off-state; and
wherein integration of the charge is interrupted after the further pulse is detected.

12. The method according to claim 10,
wherein interrupting integration of the charge comprises resetting the charge integrator of the current-to-frequency converter.

13. The method according to claim 10,
wherein interrupting integration of the charge comprises short-circuiting an integrating capacitor of the charge integrator; and/or
wherein interrupting integration of the charge comprises connecting a supply line, via which the bias current is supplied to the current-to-frequency converter, to ground potential.

14. A computer program element, which when executed on a controller of an X-ray imaging system, instructs the controller to carry out the steps of the method according to claim 10.

15. A non-transitory computer-readable medium on which the computer program element according to claim 14 is stored.

* * * * *